Jan. 4, 1966   J. R. ELWELL   3,227,178
FLUID SERVO VALVE FOR A POWER STEERING GEAR
Filed Jan. 2, 1963   3 Sheets-Sheet 1

JOHN R. ELWELL
INVENTOR.

BY John R. Faulkner
Keith L. Zerschling
ATTORNEYS

Jan. 4, 1966     J. R. ELWELL     3,227,178
FLUID SERVO VALVE FOR A POWER STEERING GEAR
Filed Jan. 2, 1963     3 Sheets-Sheet 2
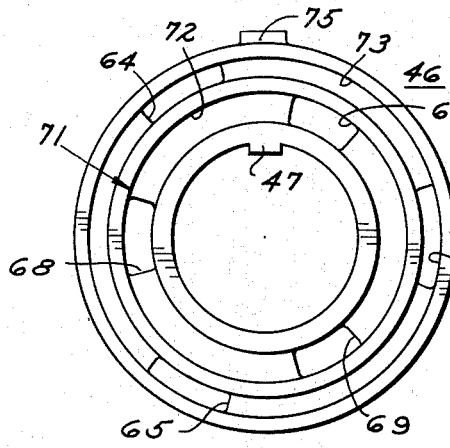
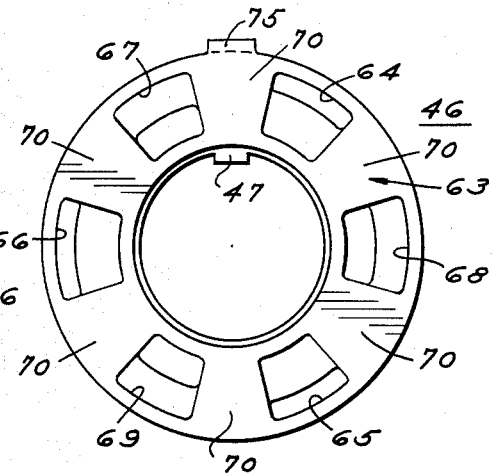
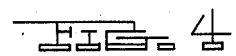
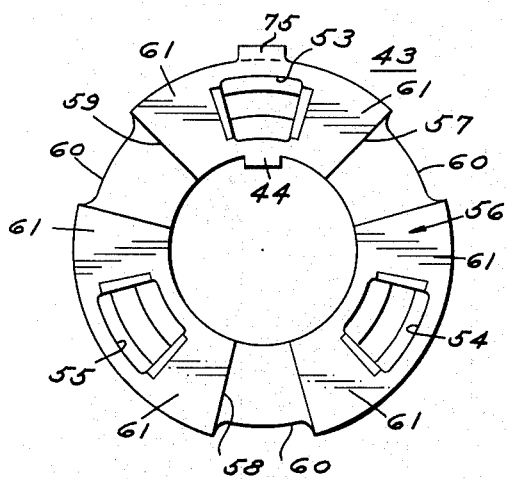
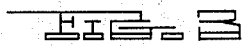
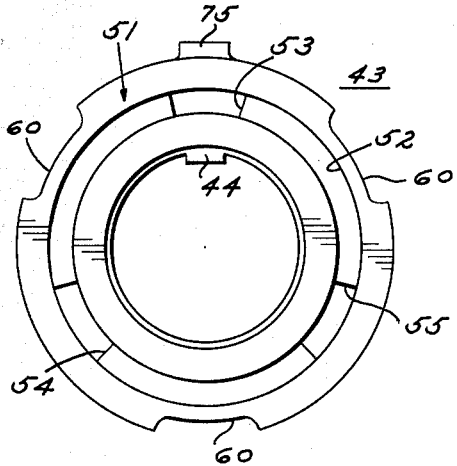
JOHN R. ELWELL
INVENTOR.
BY John R. Faulkner
Keith L. Zerschling
ATTORNEYS

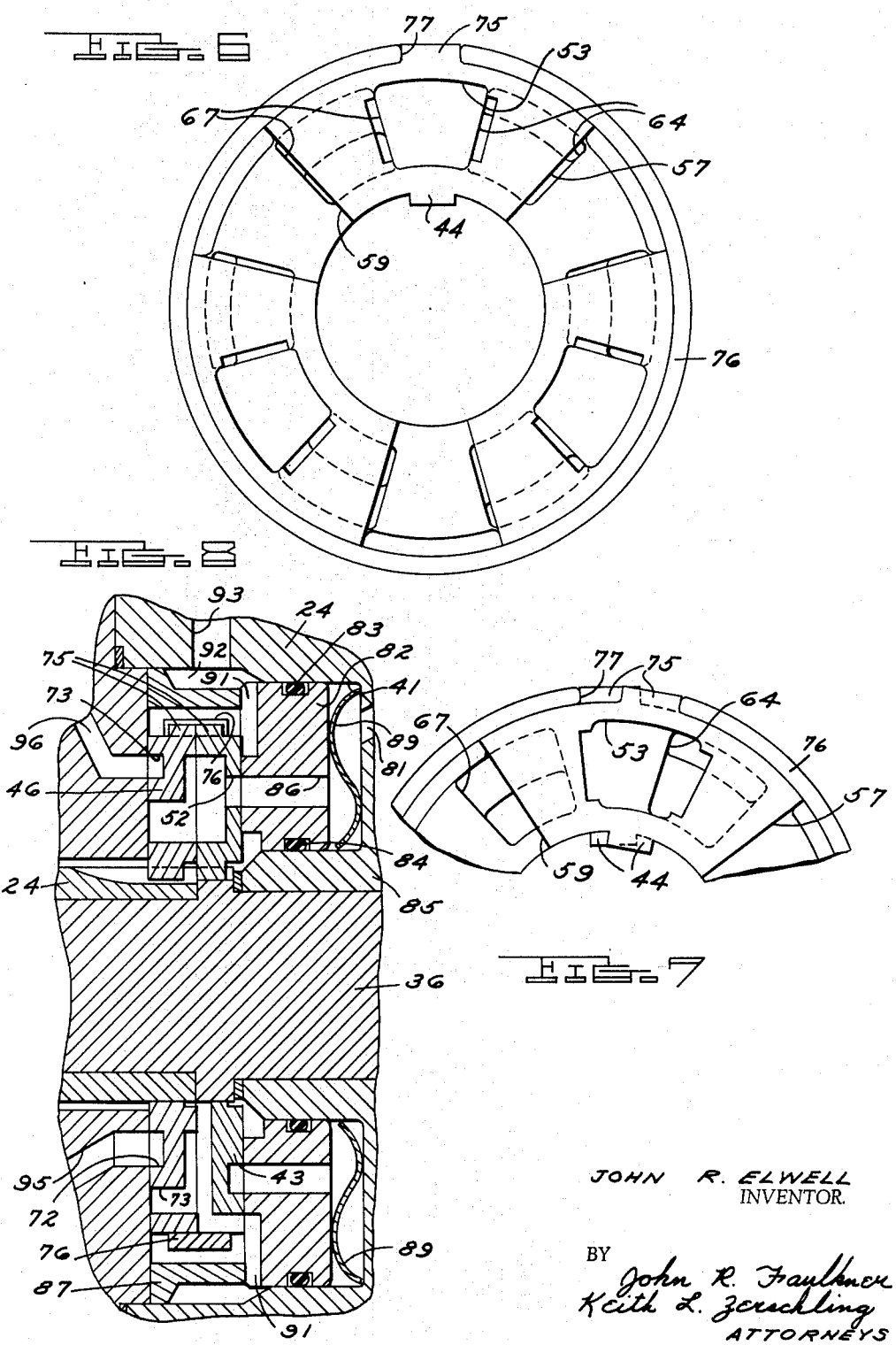

United States Patent Office 3,227,178
Patented Jan. 4, 1966

3,227,178
FLUID SERVO VALVE FOR A POWER STEERING GEAR
John R. Elwell, Dearborn, Mich., assignor to Ford Motor Company, Dearborn, Mich., a corporation of Delaware
Filed Jan. 2, 1963, Ser. No. 248,930
8 Claims. (Cl. 137—625.21)

This invention relates to a fluid power steering gear and more particularly to a fluid power steering gear including a novel fluid valve for controlling the flow of fluid under pressure to the fluid operated piston of the gear.

In fluid power steering gears it is necessary to provide a valve arrangement that directs fluid under pressure to one side or the other of a fluid operated piston when the torque required to turn the steering gear exceeds a predetermined value. It is essential that the valve operate smoothly and effectively under all operating conditions. The valve must not bind or squeal, and leakage through the valve must be kept to a minimum.

It is also very desirable to provide proper feel for the vehicle operator as he steers a vehicle equipped with power steering. This means that the effort required to turn the steering wheel of a vehicle equipped with power steering should bear a direct relationship to the steering load applied to the gear by the steerable road wheels.

The present invention provides a power steering gear that effectively meets all the requirements discussed above of a good power steering gear and valve mechanism. It does this by employing an open center plate valve that includes a C spring reaction member to provide proper driver feel. The plate valve has a first plate connected to an input member or shaft and a second plate connected to an output member. The plates are positioned in face-to-face relationship in a housing and means are provided for forcing the plates together. This means preferably takes the form of a spring that is augmented by a force proportional to the pressure of the fluid in the power steering system. Means, preferably in the form of a spacer, are employed to limit the amount of this force. This forces the plates of the plate valve together with a sufficient force to reduce leakage to a minimum, but places an upper limit on this force to prevent the valve plates from sticking or binding.

An object of the invention is the provision of a fluid power steering gear including an efficient and effective valve mechanism.

Another object of the invention is the provision of a fluid power steering gear including an efficient and effective valve mechanism that reduces leakage to a minimum without sticking or binding.

A further object of the invention is the provision of a fluid power steering gear including a valve mechanism having a reaction member that provides proper steering feel.

Other objects and attendant advantages of the present invention will become more readily apparent as the specification is considered in connection with the attached drawings in which:

FIGURE 2 is a front elevational view of one of the plates of the plate valve of the invention;

FIGURE 3 is a rear elevational view of the plate shown in FIGURE 2;

FIGURE 4 is a front elevational view of the other plate of the plate valve of the invention;

FIGURE 5 is a rear elevational view of the plate shown in FIGURE 4;

FIGURE 6 is a front elevational view of the plate valve and C spring of the invention showing the plate valve in the neutral position;

FIGURE 7 is a partial view similar to FIGURE 6 but showing the valve in position to supply fluid to a chamber formed on one side of the fluid operated piston shown in FIGURE 1; and FIGURE 8 is an enlarged partial sectional view similar to that of FIGURE 1 but taken in a different plane from that of FIGURE 1.

Figure 1:
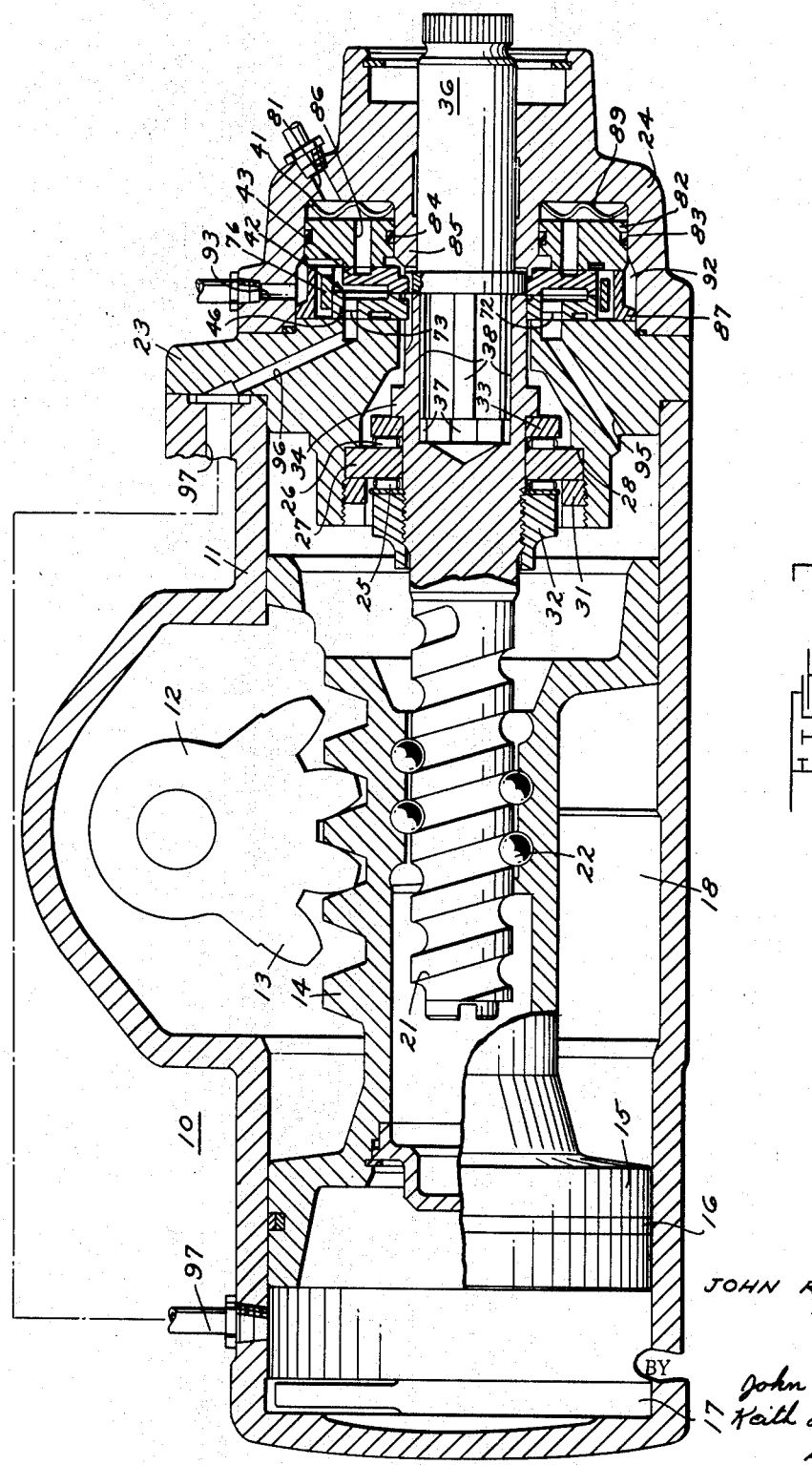
FIGURE 1 is a longitudinal sectional view through the power steering mechanism of the invention.

Referring now to FIGURE 1, there is shown the fluid power steering gear 10 of the invention that includes a housing, generally designated by the numeral 11. A sector gear shaft 12 is mounted in the housing 11 for rotatable movement, and it includes a sector gear 13. As is conventional in the art, the sector gear shaft serves as the output shaft for the power steering gear 10 and is connected to the steering linkage (not shown) of an automotive vehicle. The teeth of the sector gear 13 mesh with a rack 14 positioned on a fluid operated piston 15 that is positioned within the housing 11. This piston has a sealing member in the form of a piston ring 16 positioned at one end. This sealing member effectively divides the housing 11 into a first chamber 17 positioned one one side of the sealing member 16 and a second chamber 18 that includes the remainder of the housing positioned on the other side of the sealing member or piston ring 16.

A worm 21 extends coaxially into the piston 15 and is coupled thereto by a series of ball bearings 22 as is conventional in the art. The details of this connection have not been shown, but it is to be understood that it may be of the type shown in United States Patent 2,267,524 issued December 23, 1941 to R. Hawkins. This connection converts the rotary motion of the worm 21 into linear or reciprocatory motion of the piston 15 and also converts the linear or reciprocatory motion of the piston 15 into rotary motion at the worm 21.

The housing 11 includes an intermediate end cap 23 and an end cap 24 that are fastened by any suitable means (not shown). The intermediate end cap 23 supports the worm 21 by means of a pair of needle thrust bearings 25 and 26 positioned on either side of a fixed plate 27. Fixed plate 27 is positioned against a shoulder 28 in the intermediate end cap 23 by means of a lock ring 31. A locking collar 32 is positioned against the needle bearing 25 while the other needle bearing 26 is positioned against a washer 33 that abuts a shoulder 34 on the worm 21. The needle thrust bearings 25 and 26 and the fixed plate 27 also restrain axial movement of the worm 21. The fixed plate 27 provides a radial support and bearing for the worm 21.

An input shaft 36 of the steering gear 10 is rotatably journaled in the end cap 24 and extends into a bore 37 in the worm 21. A lost motion connection 38 is provided between the input shaft 36 and the worm 21. This lost motion connection comprises a loose spline connection that will permit a few degrees of relative rotation to take place between the input shaft 36 and the worm 21.

The end cap 24 has an annular chamber 41 positioned therein for housing a rotary plate valve, generally designated by the numeral 42. This rotary plate valve 42 controls the flow of fluid to either the chamber 17, positioned on one side of the sealing member 16, or to the chamber 18, positioned on the other side of the sealing member 17.

The rotary plate valve 42 is of the open center type and it includes a first plate 43 that fits over and is coaxial with respect to the input shaft 36. The first plate 43 is also shown in FIGURE 2, and it can be seen that it carries an internal lug 44 that provides a means for nonrotatably affixing it to the input shaft 36. Although this lug connection will not permit relative rotary movement between the first plate 43 and the input shaft 36, it will permit a limited amount of axial movement for purposes to be subsequently described. The valve 42 also includes a second or distributor plate 46 that is positioned over and is coaxial with respect to the worm 21. This second plate or distributor plate 46 is also shown in FIGURES 4 and 5, and it too has an internal lug 47 for connecting it nonrotatably to the worm 21.

The details of the plate 43 are shown in FIGURES 2 and 3. FIGURE 2 is a front elevational view of the plate 43 showing one face of this plate. It can be seen that this face, designated by the numeral 51, has an annular groove 52 positioned therein. This annular groove 52 communicates with three ports 53, 54 and 55, positioned in the other or second face 56 of this plate. As can be seen by reference to FIGURE 3, these ports are equally spaced at approximately 120° intervals in the face 56. The face 56 also has radially extending grooves 57, 58 and 59 positioned therein and these grooves are also spaced at approximately 120° intervals alternately with the ports 53, 54 and 55. The grooves 57, 58 and 59 each terminate in a circumferential notch 60 that is cut through the entire width of the plate 43. It should be understood that the grooves 57, 58 and 59 do not extend to a depth to communicate with the annular groove 52 positioned in the face 51. The placement of these ports and grooves leaves a land 61 positioned between each port and each groove.

The details of the second or distributor plate 46 are shown in FIGURES 4 and 5. The first face 63 of the second plate 46 is positioned against the second face 56 of the first plate 43. It has a first group of ports positioned therein that are equally spaced circumferentially in the first face 63. With three ports, as shown, the ports are spaced at 120° intervals. These ports are designated by the numerals 64, 65 and 66, and they direct fluid radially outwardly from the center of the ports. This first face 63 also has a second group of ports that direct fluid radially inwardly from the center of these ports and these ports are also equally spaced at 120° intervals circumferentially on the face 63 of the plate 46. These ports are designated by the numerals 67, 68 and 69. It can be seen that the ports 64, 65 and 66 of the first group are alternately spaced with respect to the ports 67, 68 and 69 of the second group, and that a land 70 is left between each port. The second face 71 of the second plate 46 has a first annular groove 72 and a second annular groove 73 positioned therein. The second annular groove 73 is concentric with and is spaced radially outwardly from the first groove 72. The first annular groove 72 communicates with the ports of the second group, ports 67, 68 and 69, positioned in the face 63, and the annular groove 73 communicates with the ports of the first group, ports 64, 65 and 66, positioned in the first face 63.

Each of the valve plates 43 and 46 has a radially extending lug 75 positioned thereon, and these lugs, when aligned, provide means for positioning the valve plates 43 and 46 in the neutral position of the valve. The means for so aligning the lugs comprises a split ring or C spring 76 that has an axially extending slot 77 positioned therein. This spring is positioned around and envelops the circumference of the plates 43 and 46 and it restrains or serves as a reaction member against the relative rotation of the valve plates 43 and 46, and consequently as a reaction member against relative rotation between the input shaft 36 and the worm 21. This spring may be so arranged so that there is a slight preload on the lugs 75 and so that the force required to rotate the plates 43 and 46 relative to one another increases as a function of the rotary displacement of the valve plates from the neutral position.

As shown in FIGURES 1 and 8, fluid under pressure is supplied to the annular cavity 41 in the end cap 24 through a pressure inlet port 81. A pressure plate or piston 82 is positioned within the annular cavity 41 and it includes an O-ring seal 83 that provides a seal between the pressure plate or piston 82 and an inner wall of the end plate 24. A second O-ring seal 84 provides a seal between the pressure plate or piston 82 and a boss 85 of the end cap 24. Fluid under pressure is supplied through a plurality of passages 86 in the pressure plate or piston 82 to the annular groove 52 in the first plate 43. The pressure plate or piston 82 engages the first face of the first plate 43 and it also engages an annular spacer 87 that is positioned radially outwardly from the first plate 43, second plate 46, and the C spring reaction member 76 under the urging of spring 89 that may take the form of a wave washer. The pressure plate 82 has a plurality of radially extending grooves 91 that will permit fluid to flow from the valve plates 43 and 46 around the C spring 76 through the grooves 91 and into an annular space 92 positioned outside the spacer. This annular space 92 is connected to an exhaust port 93. The spacer is made a few ten thousandths of an inch, for example, .0008–.001 inch thicker than the combined thickness of the first valve plate 43 and the second valve plate 46.

The annular groove 72 in the second plate 46 is connected to a drilled passageway 95 in the intermediate end cap 23. This drilled passageway 95 communicates with the chamber 18 positioned on one side of the sealing member 16 of the fluid operated piston 15. The other annular groove 73 in the second plate 46 is connected to a drilled passageway 96 in the intermediate end cap 23. This drilled passageway communicates with the chamber 17 positioned on the left side of the sealing ring 16 positioned in the fluid operated piston 15 through a conduit generally designated by the numeral 97.

In the operation of the steering gear and plate valve mechanism of the invention, fluid under pressure is applied to the pressure inlet port 81 from a source of fluid under pressure, for example, a power steering pump (not shown). This fluid under pressure is in turn supplied to the ports 53, 54 and 55 in the second face 56 of the first valve plate 43, through the passages 86 in the pressure plate or piston 82 and through the annular groove 52 in the first face 51 of the valve plate 43. With the valve in the neutral position, the ports 53, 54 and 55 span the lands 70 positioned between ports 64 and 67, between ports 68 and 65, and between ports 69 and 63 respectively of the second valve plate 46 since the ports 53, 54 and 55 are made slightly wider than the lands 70. This can be seen by reference to FIGURE 6. Thus, flow from the ports 53, 54 and 55 divides equally and flows equally into the ports 64, 65, 66, 67, 68 and 69 positioned in the first face 63 of the second valve plate 46.

Taking port 53, for illustrative purposes, it can be seen that when the valve is in the neutral position where the lugs 75 on the valve plates 43 and 46 are aligned, the port 53 overlaps the lands 70 so that it communicates equally with the ports 67 and 64 in the second valve plate 46. The ports 67 and 64 overlap the land 61 positioned on either side of the port 53 so that they are in communication equally with the grooves 59 and 57 respectively positioned on either side of the port 53. Thus, in the neutral position fluid flows through the valve without building up any differential pressure to be applied to either the chamber 17 or the chamber 18. It can be appreciated that the same action occurs at the ports 54 and 55 and the associated ports in the second plate 46 and at the remaining grooves in the first plate 43.

During steering operations, if the effort required to turn the steering wheel (not shown) that is connected to the input shaft 36 exceeds a predetermined amount, the power steering gear and valve mechanism will be actuated to provide a power assist for the steering mechanism. Torque in excess of this predetermined amount will rotate the input shaft 36 relative to the worm 21 and the first valve plate 43 relative to the second valve plate 46 against the force of the C spring 76. This spreads the C spring 76, as shown in FIGURE 7, through the lugs 75 of the valve plates 43 and 46. If, for example, a right turn is to be accomplished, the input shaft 36 will be rotated clockwise relative to the worm 21 and the first valve plate 43 will be rotated clockwise relative to the second plate 46 as viewed in FIGURES 6 and 7. When this occurs, the grooves 57, 58 and 59 in the first plate 43 are rotated so that the area of communication with the first group of ports 64, 65 and 66 in the second plate 46 is substantially reduced or cut off. This can be seen by looking at the port 64 in FIGURE 7. Also, the ports 53, 54 and 55 are rotated so that flow from them to the second group of ports 67, 68 and 69 in the second valve plate 46 is throttled, and so that the ports 53, 54 and 55 have a greater area of communication with the ports 64, 65 and 66 of the first group in the second plate. This action results in a buildup of pressure in the first group of ports 64, 65 and 66 in the second plate 46. Fluid under this pressure will then flow from these ports 64, 65 and 66 through the annular groove 73 in the second face 71 of the second valve plate 46, through the drilled passageway 96 and through the conduit 97 to the chamber 17 thereby moving the power piston 15 to the right as viewed in FIGURE 1.

Fluid from the chamber 18 may flow back to the exhaust port 93 through the drilled passageway 95, the inner annular groove 72 in the second valve plate 46, through ports 67, 68 and 69 in the second valve plate 46 and through the grooves 57, 58 and 59 in the second face of the first plate 43, through the circumferential notches 60 in this plate, through the grooves 91 positioned in the pressure plate or piston 82, to the exhaust port 93. The ball bearings 22 will convert the linear motion of the piston 15 to a rotary motion of the worm 21. This serves to cancel the steering error in the system and realigns the valve plates 46 and 43 in the neutral position when the required steering operation has been completed.

When a left hand turn is negotiated, the first valve plate 43 will rotate counterclockwise with respect to the second valve plate 46 and fluid under pressure will then flow into the chamber 18 through the second group of ports 67, 68 and 69 in the second plate 46, through the annular groove 72 and through the drilled passageway 95. Fluid is exhausted from the chamber 17, through the conduit 97, the drilled passageway 95, the annular groove 73 in the second valve plate 46, and the first group of ports 64, 65 and 66, through the grooves 57, 58 and 59 in the first valve plate 43 and then through the passages previously described, to the exhaust port 93.

From the foregoing discussion it can be appreciated that the fluid valve 42 can be properly called a fluid servo valve and that the input shaft 36 serves as an input member to this valve, while the worm 21 serves as an output member for the valve.

The wave washer 89 will exert a force on the pressure plate or piston 82 under all operating conditions. When the fluid pressure in the system is low, the spring 89 acting through the pressure plate or piston 82 will force the valve plates 43 and 46 together. The force applied by the spring will be limited, however, by the engagement of the pressure plate or piston 82 with the annular spacer 87. This limiting action of the spacer 87 is particularly important when fluid pressure is low, since it prevents binding and sticking of the valve when there is very little internal pressure in the valve 42 to resist the force of the spring. Thus at low operating pressures, such as occur at engine idle with the valve in the neutral position, the spring 89, the pressure plate or piston 82 and the annular spacer 87 provide a means for forcing the valve plates 43 and 46 into proper engagement without causing binding or sticking of the valve plates 43 and 46.

At higher system pressures, the pressure plate or piston 82 is urged toward the valve plate 43 with a force that is substantially proportional to the pressure in the system. This action prevents the valve plates 43 and 46 from separating under the impetus of these high fluid pressures. It can also be appreciated that the movement of the pressure piston or plate 82 is limited at its outer periphery by engagement with the annular spacer 87. Under very high pressures, however, the portion of the pressure plate or piston 82 positioned radially inwardly from the annular spacer 87 is capable of deflection toward the valve plate 43. This deflection will counteract any deflection or movement of the valve plates 43 and 46 caused by internal pressure in the valve that might cause leakage through the valve 42 at high pressures.

The split ring or C spring reaction member 76 provides the proper feel for the operator of the motor vehicle as he operates the power steering gear 10. This feel is equal regardless of whether a right turn or a left turn is being accomplished by the vehicle operator, since a turn in either direction merely spreads the C spring under the force of the lugs 75 of the valve plates 43 and 46 of the plate valve. The C spring reaction member is also a very inexpensive and uncomplicated mechanism for providing proper feel and for providing a means for centering the open center rotary valve 42 in its neutral position.

The present invention thus provides a very effective, inexpensive and uncomplicated power steering gear and valve mechanism.

It will be understood that the invention is not to be limited to the exact construction shown and described, but that various changes and modifications may be made without departing from the spirit and scope of the invention as defined in the appended claims.

I claim:
1. A servo valve for use with a power steering gear comprising a housing, an input and an output member rotatably supported coaxially within said housing, said input and said output members being coupled by a lost motion connection, a first valve plate, means connecting said first valve plate to said input member and for permitting limited axial movement of said first valve plate with respect to said input member, a second valve plate connected to said output member, said valve plates being positioned in face-to-face relationship, each of said valve plates having a radially extending lug, a circumferentially extending split ring spring surrounding said valve plates and engaging said radially extending lugs to align said radially extending lugs and position said valve plates in the neutral position of said servo valve, said first and said second valve plates having means positioned therein for performing a valving function as said valve plates are rotated relative to one another, said circumferentially extending split ring spring resisting movement of said output member relative to said input member and the relative rotation of said valve plates, and a spacer of slightly greater width than the combined width of said valve plates positioned in said housing and in spaced relationship around said valve plates and said circumferentially extending split ring spring, a pressure piston positioned in said housing engaging said spacer and said first valve plate and movable in an axial direction with respect to said valve plates, and means positioned in said housing and on the side of said piston opposite said valve plates and adapted to supply fluid under pressure to said piston whereby said pressure piston is adapted to exert a force on said spacer and said first valve plate proportional to the pressure of the fluid.

2. A servo valve for use with a power steering gear, comprising an input member and an output member, a housing, said input and said output members being rotatably supported coaxially with said housing, a lost motion connection coupling said input and said output members, a first valve plate, means connecting said first valve plate to said input member and for permitting limited axial movement of said first valve plate with respect to said input member, said first valve plate being substantially normal to said input member, a second valve plate connected to said output member, said second valve plate being substantially normal to said output member, said valve plates being positioned in face-to-face relationship, each of said valve plates having a radially extending lug, said valve plates being positioned in a neutral position when said lugs are aligned, and a circumferentially extending split ring spring surrounding said valve plates and engaging said radially extending lugs to align said radially extending lugs and position said valve plates in the neutral position, said circumferentially extending split ring spring resisting movement of said output member relative to said input member and the relative rotation of said valve plates, said valve plates having cooperating juxtaposed ports positioned therein for controlling the flow of fluid through said valve plates as said valve plates are rotated relative to one another against the force of said circumferentially extending split ring spring, an annular spacer of slightly greater width than the combined width of said valve plates positioned in said housing coaxially with respect to said input and output members and in spaced relationship around said valve plates and said circumferentially split ring spring, and a pressure piston positioned in said housing coaxially with respect to said annular spacer and said input and said output members, said pressure piston engaging said spacer and said first valve plate and being movable in an axial direction with respect to said valve plates and said annular spacer, and means positioned in said housing and on the side of said piston opposite said valve plates adapted to supply fluid under pressure to said pressure piston whereby said pressure piston is adapted to exert a force on said spacer and said first valve plate proportional to the pressure of the fluid.

3. A fluid servo valve for use with a fluid power steering gear comprising an output member, an input member coupled to said output member through a lost motion connection, a first valve plate, a second valve plate, means connecting said first valve plate to said input member and permitting limited axial movement of said first valve plate relative to said input member, means connecting said second valve plate to said output member and positioning said second valve plate against said first valve plate, spring means engaging said first valve plate and said second valve plate for resisting relative rotation between said valve plates, said first and said second valve plates including means positioned therein for performing a valving function as said valve plates are rotated relative to one another, a spacer of slightly greater width than the combined width of said first and said second valve plates, a pressure piston engaging said first valve plate and said spacer and adapted to receive fluid under pressure, said pressure piston being adapted to exert a force on said spacer and on said first valve plate proportional to the pressure of the fluid, said pressure piston including means for delivering fluid under pressure to said first valve plate.

4. A fluid servo valve for use with a fluid power steering gear comprising an output member, an input member coupled to said output member through a lost motion connection, a first valve plate, a second valve plate, means for connecting said first valve plate to said input member and permitting limited axial movement of said first valve plate relative to said input member, means connecting said second valve plate to said output member and positioning said second valve plate against said first valve plate, spring means engaging said first valve plate and said second valve plate for resisting relative rotation between said valve plates, said first and second valve plates including means positioned therein for performing a valving function as said valve plates are rotated relative to one another, a spacer of slightly greater width than the combined width of said first and second valve plates, a pressure piston engaging said first plate and said spacer and adapted to receive fluid under pressure and exert a force on said spacer and on said first valve plate proportional to the pressure of the fluid, said pressure piston including means for delivering fluid under pressure to said first valve plate, and spring means engaging said pressure piston for urging said pressure piston into engagement with said first valve plate and said spacer and for urging said first valve plate into engagement with said second valve plate.

5. A fluid servo valve for use with a fluid power steering gear comprising an output member, an input member coupled to said output member through a lost motion connection, a first valve plate and a second valve plate, means for connecting said first valve plate to said input member and permitting limited axial movement of said first valve plate relative to said input member, means for connecting said second valve plate to said output member and positioning said second valve plate against said first valve plate, said first and said second valve plates including means positioned therein for accomplishing a valving function as said valve plates are rotated relative to one another, spring means engaging said first valve plate and said second valve plate for resisting relative rotation between said valve plates, a spacer of slightly greater width than the combined width of said first and said second valve plates, and a pressure piston engaging said first valve plate and said spacer and adapted to receive fluid under pressure and exert a force on said spacer and on said first valve plate proportional to the pressure of the fluid.

6. A fluid servo valve for use with a power steering gear comprising, a housing, an input member and an output member rotatably supported coaxially within said housing, said input and said output members being coupled by a lost motion connection, a first valve plate and a second valve plate, means for connecting said first valve plate to said input member and permitting limited axial movement of said first valve plate relative to said input member, means for connecting said second valve plate to said output member and positioning said second valve plate against said first valve plate, said first and said second valve plates having cooperating juxtaposed ports positioned therein for accomplishing a valving function as said valve plates are rotated relative to one another, each of said valve plates having a radially extending lug, a circumferentially extending split ring spring surrounding said valve plates and engaging said radially extending lugs to align said radially extending lugs and position said plates in a neutral position of said servo valve, said circumferentially extending split ring spring resisting movement of said output member relative to said member shaft and the relative rotation of said valve plates, an annular spacer of slightly greater width than the combined width of said first valve plate and said second valve plate positioned in said housing around said valve plates and said split ring spring, a pressure piston positioned in said housing engaging said first valve plate and said spacer, said pressure piston being adapted to receive fluid under pressure and to exert a force on said spacer and said first valve plate proportional to the pressure of the fluid.

7. The combination of claim 6 in which a spring means engages said pressure piston and said housing for urging said pressure piston into engagement with said first valve plate and said spacer.

8. In a fluid servo valve for a power steering gear having a fluid operated piston the combination comprising, a housing, an input member and an output member rotatably positioned coaxially within said housing, said input and output members being coupled by a lost motion connection, a first valve plate connected to said input member and having a first face and a second face, a second valve plate connected to said output member and having a first face and a second face, said first and said second valve plates being positioned coaxially with respect to said input member and said output member, the faces of said first valve plate and said second valve plate being positioned substantially normal to the axes of said input and said output member, the second face of said first valve plate being positioned against the first face of said second valve plate, the first face of said first valve plate having an annular groove positioned therein, means positioned in said housing and adapted to deliver fluid under pressure to said annular groove, a plurality of spaced ports positioned in the second face of said first valve plate communicating with said annular groove in said first face, the second face of said first valve plate also having a plurality of radially extending grooves, a radially extending groove being positioned on each side of each of said ports, the second face of said second valve plate having a first annular groove positioned therein and a second annular groove positioned therein radially spaced outwardly from said first annular groove, the first face of said second valve plate having a first group of ports communicating with said first annular groove in said second face of said valve plate and a second group of ports communicating with the second annular groove positioned in said second face, spring means for engaging said first and second valve plates for urging said valve plates into a neutral position, a port in said first group being positioned on one side of each of the ports in the second face of said first valve plate and a port in said second group being positioned on the other side of each of the ports in the second face of said first valve plate, said ports in said second face of said first valve plate communicating equally with ports of said first group and the ports of said second group, and the ports of said first group and said second group communicating equally with the radial grooves in the second face of said first valve plate when the valve is in the neutral position, relative rotation of the valve plates in one direction directing fluid under pressure into one of said groups of ports and into said first annular groove in the second face of said second valve plate and relative rotation in the other direction directing fluid under pressure into the other of said groups of ports and into said second annular groove in said second face of said second valve plate, conduit means connected to said first annular groove in the second face of said second valve plate and adapted to deliver fluid under pressure to one side of the fluid operated piston and conduit means connected to the second annular groove in the second face of said second valve plate and adapted to deliver fluid under pressure to the other side of the fluid operated piston.

References Cited by the Examiner

UNITED STATES PATENTS

| | | | |
|---|---|---|---|
| 209,382 | 10/1878 | Corkhill | 251—185 X |
| 620,282 | 2/1899 | Cooper | 91—375 |
| 1,744,451 | 1/1930 | Demarest | 251—185 |
| 2,380,369 | 7/1945 | Nix | 91—375 X |
| 2,640,322 | 6/1953 | Puerner | 60—52 |
| 2,917,079 | 12/1959 | Verbrugge | 91—375 X |
| 2,988,059 | 6/1961 | Wysong | 91—375 |
| 3,138,069 | 6/1964 | Bishop | 91—375 |

M. CARY NELSON, *Primary Examiner.*

SAMUEL LEVINE, *Examiner.*